United States Patent

[15] 3,687,019

Wolf

[45] Aug. 29, 1972

[54] HERMETIC COMPRESSOR DISCHARGE TUBE JOINT CONSTRUCTION

[72] Inventor: Rudolf Herman Wolf, Adrian, Mich.

[73] Assignee: Tecumseh Products Company, Tecumseh, Mich.

[22] Filed: April 24, 1970

[21] Appl. No.: 31,503

[52] U.S. Cl.............92/169, 285/DIG. 16, 285/297, 29/458
[51] Int. Cl.............................................F01b 11/02
[58] Field of Search........417/902, 312; 285/DIG. 16, 285/297, 284; 29/470, 484, 503, 458; 92/169

[56] References Cited

UNITED STATES PATENTS

| 23,811 | 4/1809 | Quinn | 285/297 |
|---|---|---|---|
| 2,741,498 | 4/1959 | Elliott | 285/DIG. 16 |
| 3,068,563 | 12/1962 | Reverman | 285/DIG. 16 |
| 3,104,051 | 9/1963 | Henning | 417/902 |
| 3,208,136 | 9/1965 | Joslin | 285/284 |
| 3,279,683 | 10/1966 | Kleinhein | 417/312 |
| 3,343,252 | 9/1967 | Reesor | 285/DIG. 16 |
| 3,347,728 | 10/1967 | Preotle | 29/458 |
| 3,531,222 | 9/1970 | Randall | 417/902 |

*Primary Examiner*—Edgar W. Geoghegan
*Assistant Examiner*—Ronald H. Lazarus
*Attorney*—Barnes, Kisselle, Raisch & Choate

[57] ABSTRACT

A hermetic compressor discharge line construction wherein the discharge chamber in the cylinder head of the compressor is connected to an external high side outlet by a discharge passageway which includes a discharge muffler and inlet and outlet tubes connected thereto. The muffler inlet tube is joined to the cylinder head by spaced portions of the inlet tube engaging with an interference fit the wall of a bore in the cylinder head. A reduced diameter portion of the inlet tube disposed between the spaced portions defines a clearance space with the bore which is filled with an anaerobic curing adhesive sealant composition. The muffler outlet tube is joined to a discharge conduit by a telescopic connection wherein a male tube end is engaged mechanically at two spaced points in the bore of the female member, the space between the two engagement points likewise being filled with an anaerobic curing sealant composition. These joints are made by outwardly flaring the mouth of the female member, partially inserting the male end in the mouth, placing liquid adhesive in the well defined by the space between the mouth and male tube, and then further inserting the male member until it engages an internal shoulder in the female member.

1 Claim, 6 Drawing Figures

Patented Aug. 29, 1972
3,687,019
2 Sheets-Sheet 1
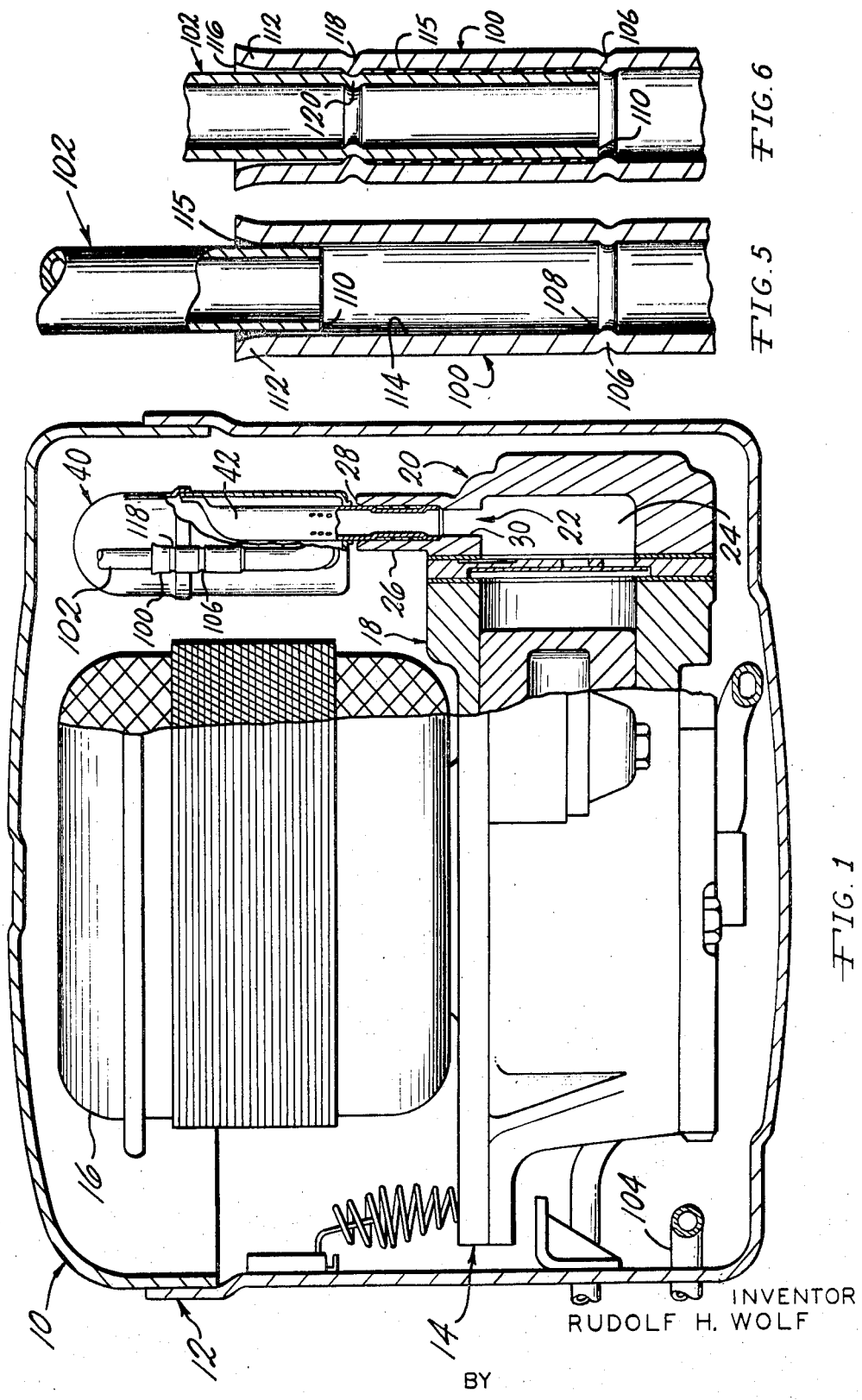
INVENTOR
RUDOLF H. WOLF
BY
Barnes, Kisselle, Raisch & Choate
ATTORNEYS

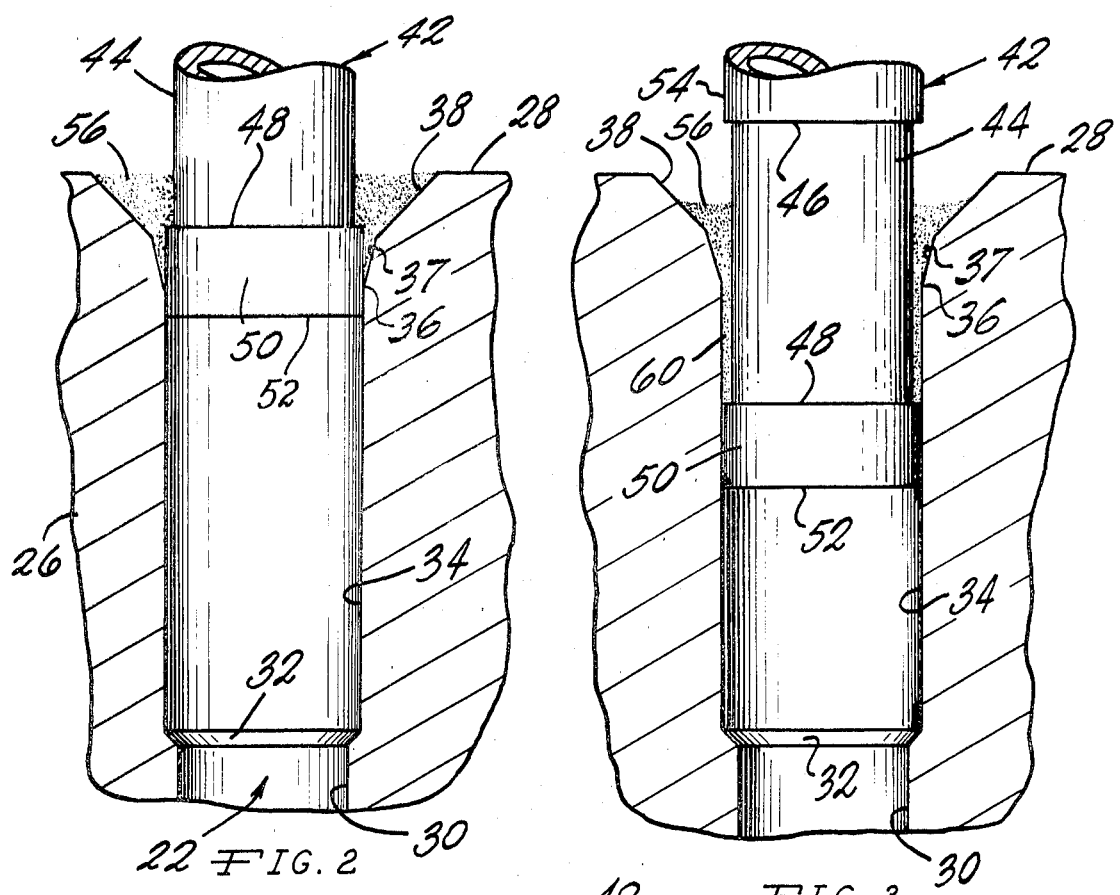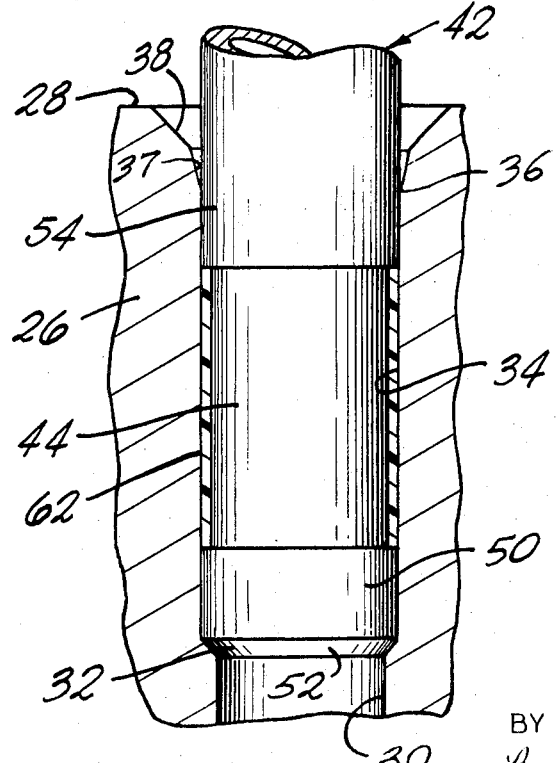

HERMETIC COMPRESSOR DISCHARGE TUBE JOINT CONSTRUCTION

This invention relates to hermetic compressor discharge tube joint constructions and more particularly to a combination mechanical and adhesive high pressure joint construction and method of making the same.

An object of the present invention is to provide a strong, secure joint construction capable of withstanding the high pressures encountered in the high side line of a hermetic compressor of the type used in refrigeration, air conditioning and similar mechanical cooling systems without the need for soldered, welded or brazed joints.

Another object is to provide an improved method of making a joint of the above character which is economical, capable of being performed by relatively unskilled labor, creates a minimum of mess and/or wastage of sealant material and wherein the curing of the joint sealant can be accomplished in the usual demoisturizing oven subsequent to initial assembly of the joint during manufacture of the hermetic compressor.

Other objects as well as features and advantages of the present invention will become apparent from the accompanying detailed description taken in conjunction with the accompanying drawings wherein:

FIG. 1 is a vertical sectional view through the hermetic casing of a typical reciprocating piston-type hermetic compressor, with portions of the compressor broken away and shown in vertical center section to better illustrate details of the improved joint construction of the present invention.

FIGS. 2, 3 and 4 are greatly enlarged fragmentary vertical sectional views illustrating in sequence the method of the invention as applied to the construction of the joint between the discharge muffler inlet tube and the discharge passage in the cylinder head of the compressor shown in FIG. 1.

FIGS. 5 and 6 are enlarged fragmentary vertical sectional views illustrating in sequence the steps of the method as applied to the construction of the joint between the outlet tube of the discharge muffler and the discharge tube which extends from the outlet tube through the interior space of the compressor to an exterior outlet.

Referring in more detail to FIG. 1, an improved hermetic motor-compressor unit 10 of the present invention is illustrated wherein most of the components are of wellknown conventional construction as will be recognized by those skilled in the art. Thus, compressor unit 10 has a heretic casing 12 in which is resiliently suspended a reciprocating piston gas pump compressor 14 and an associated electric motor 16 for driving the same. The cylinder block 18 of the compressor has a cast iron cylinder head 20 which is of conventional construction except for a discharge passage 22 constructed in accordance with the present invention. Discharge passage 22 communicates with the discharge chamber 24 of head 20 and extends vertically upwardly through an upright boss 26 to an opening at the horizontal end surface 28 of boss 26.

As best seen in FIG. 2, discharge passage 22 comprises a bore 30 open at its lower end to chamber 24 and extending upwardly to a junction at shoulder 32 with a larger diameter counterbore 34. Counterbore 34 is coaxial with bore 30 and extends vertically upwardly to a junction at 36 with a first frusto-conical surface 37 which opens to a second more widely tapered frusto-conical surface 38 formed by double chamfering the upper end of counterbore 34. Bore 34 is cylindrical and of uniform diameter and may, for example, have an inside diameter of 0.495 inch and extend for a distance of 1.218 inches measured from shoulder 32 to junction 36.

As best seen in FIG. 1, compressor unit 10 has a sheet metal type discharge muffler 40 serially connected in the high side discharge line immediately above cylinder head 20. Muffler 40 has an inlet tube 42 with a stem projecting vertically downwardly from the lower end thereof into a sealed joint connection with boss 26 in accordance with the present invention. Tube 42 preferably comprises high pressure refrigerant tubing such as electrically welded or seamless steel tubing and, for example, may have a wall thickness of 0.049 inch and a nominal outside diameter of ½ inch.

As best seen in FIG. 3, tube 42 at its lower free end has a reduced diameter portion 44 with a cylindrical outer periphery extending from an upper shoulder 46 to a lower shoulder 48. Portion may be formed in the uniform diameter tube 42 by turning, grinding, shrinking or other conventional mechanical working or machining methods. In the example given above, portion 44 has an axial length of 0.75 inch and an outside diameter of 0.49 inch nominal so that the radial clearance between portion 44 and the concentric wall of bore 34 is 0.0025 inch, giving a diametrical clearance of 0.005 inch. Preferably, the diameter of the terminal head portion 50 of tube 42 (the portion extending between shoulder 48 and the end surface 52 of tube 42) as well as the main portion 54 of tube 42 (the portion extending vertically upwardly from shoulder 46) have the same diameter, which preferably is the nominal outside diameter of the tubing as purchased. POrtions 50 and 54 are dimensioned relative to the inside diameter of bore 34 so as to have an interference fit therewith in the order of 0.002 inch in the example given above.

Tube 42 and bore 30, counterbore 34, bevel 38 and end surface 28 are constructed as described above as the first stage of one embodiment of the method of the invention of constructing the improved high pressure sealed joint construction of the present invention. The remaining steps are best illustrated in the sequence of FIGS. 2, 3 ad 4. With bore 34 extending vertically so that bevel 38 faces upwardly, the next step is to insert portion 50 into mouth 38 until portion 50 is just started in counterbore 34 as shown in FIG. 2. This requires a slight force fit to position end face 52 of tube 42 slightly below the junction 36 of counterbore 34 with bevel 37–38. This initial mechanical engagement of the tube 42 with the wall of counterbore 34 thus seals the annular space between bevel 38 and the exterior of portion 50 from counterbore 34 to thereby form a well for holding a given quantity of adhesive.

In the next step of the method liquid adhesive 56 is poured into the chamfer well until the surface of liquid adhesive is generally flush with end surface 28 of boss 26. Tube 42 then is forced with a steady, even pressure into counterbore 34 as shown in FIG. 3. As portion 44 of the tube is submerged in and passes through the pool of adhesive 56, it becomes coated with adhesive, and the adhesive is carried down and along with portion 44 as a result of gravity, adhesion and capillary action into the annular clearance space 60 defined radially between portion 44 and counterbore 34. As the liquid is taken along with portion 44, the level of the liquid in the chamfer well drops, as indicated in FIG. 3. By the time shoulder 46 reaches junction 36 all, or almost all, of the adhesive will have been carried down into clearance space 60. Once portion 54 engages the wall of counterbore 34, the liquid adhesive 56 will be trapped between the force fit mechanical seals formed by the press fit engagement of portion 50 and of portion 54 with the wall of counterbore 34. Since the clearance space 60 extending axially between shoulders 48 and 46 and radially between portion 44 and counterbore 34 at this point is filled completely with adhesive 56, there is no further contact of the adhesive with outside atmosphere. Further insertion movement of tube 42 is halted by the tube end surface 52 striking shoulder 32 at the lower end of counterbore 34.

In the next step of the method adhesive 56 is allowed to cure to form a solid adhesive seal and annular gasket, as illustrated by the plastic sectioned cylindrical annulus 62 in FIG. 4. The adhesive will bond tightly to the steel surface of portion 42 and to the cast iron surface of counterbore 34. Preferably, this curing step is performed by induction or resistance heating the adhesive for a short period of time immediately after insertion of tube 42 to its home position shown in FIG. 4 to thereby pre-cure the adhesive in the pocket and form an initial bond of tube 42 to the boss 26 sufficient to withstand a 400 p.s.i. leak test. Further accelerated curing preferably is provided merely by utilizing the heat applied in the compressor dehydration step during the last stage of manufacture wherein the assembled unit is heated for 6 hours at 300° F.

Preferably adhesive 56 is an anaerobic adhesive sold under the trademark "LOCTITE" No. 40 manufactured by Loctite Corporation of Newington, Connecticut. Other anaerobic adhesives which may be used are those disclosed in United States Pat. No. 3,043,820 and/or No. 3,046,262. Such adhesives have the desirable property of polymerizing to the solid state in the presence of certain organic hydroperoxide catalysts rapidly and spontaneously upon the exclusion of air or oxygen from the composition. In addition, such compositions provide the advantage of long shelf life in a liquid state as long as contact with air is maintained. This feature is useful particularly in the bonding or adhering of adjacent surfaces in the present method since the composition can be stored or permitted to stand in contact with air for extended periods of time without polymerization. However, when such an adhesive is drawn into the annular clearance space and trapped between portions 50 and 54, the resulting exclusion of air produces polymerization of the composition to form a strong bond between the adjacent surfaces.

For example, muffler-cylinder head assemblies 20-40 constructed pursuant to the illustrative specifications set forth previously herein were tested to determine the shear strength of the mechanical and adhesive bond of the joint shown in FIG. 4, and the maximum bond strength to rupture ranged from about 1,300 to 2,000 pounds measured on an Instron machine using a crosshead speed of 0.050 inch per minute.

FIGS. 5 and 6 illustrate another embodiment of a hermetic compressor discharge tube joint construction applied to the connection of the outlet tube 100 of muffler 40 with a tubular discharge line 102 which extends within the interior space of the hermetic casing 12 to a through-wall joint such as that illustrated at 104 (FIG. 1). Tube 100 may be copper tubing and tube 102 may be seamless welded steel tubing such as that sold under the trademark "BUNDYWELD" by Bundy Corporation of Detroit, Michigan. Tube 100 is preferably preformed to provide a crimp 106 at a point spaced downwardly from the upper end thereof a distance of, for example, 1 inch to 1 ⅝ inches. Crimp 106 provides an internal annular shoulder 108 which serves as a stop for the male tube 102 when the outer edge of the end surface 110 thereof abuts shoulder 108 as shown in FIG. 6. Preferably, the upper end of tube 100 is flared outwardly to provide an outwardly diverging mouth portion 112. The male end portion of tube 102 which is to be telescoped within tube 100 need not be pre-worked but preferably has a uniform outside diameter and is given a surface cleaning treatment. Bore 114 of tube 100 running from crimp 106 to mouth 112 is also preferably of uniform diameter and is larger than the outside diameter of the end of tube 102 so that the diametrical clearance between tubes 100 and 102 preferably ranges from 0.003 to 0.006 inches.

With the ends of tubes 100 and 102 thus prepared in accordance with the method of the present invention, the construction of the modified discharge conduit connection is completed by partially inserting conduit 102 into the tapered mouth 112 of tube 100, as shown in FIG. 5. Then a quantity of liquid adhesive 115, preferably an anaerobic adhesive of the type described previously herein, is placed in the space between the outer surface of member 102 and the adjacent surface 116 of mouth 112 to fill the well formed by this space, thereby providing a pool of adhesive encircling member 102. Member 102 is inserted further into a member 100 at a gradual even rate, thereby advancing the outer surface of member 102 through the adhesive pool and thus coating the outer surface of member 102 with the adhesive. This simultaneously draws the adhesive downwardly from the pool into the annular clearance space between the outer surface of member 102 and the wall of bore 114. The inward movement of member 102 is stopped by end edge 110 striking shoulder 108, as shown in FIG. 6.

Then a suitable crimping tool is applied around the exterior surface of tube 100 to form a second annular crimp 118 in tube 100 at a point fairly close to the mouth 112 of tube 100. The forming of crimp 118 simultaneously produces a mating crimp 120 in tube 102 to thereby mechanically interengage tubes 100 and 102. Tubes 100 and 102 are thus mechanically locked together and at the same time a hermetic seal is formed which excludes air from the adhesive filled annular space or chamber defined radially between the outer surface of tube 102 and the inner surface of tube 100 and axially between shoulder 108 and crimp 118. This exclusion of oxygen thus causes the adhesive 115 to polymerize and form a strong bond with the adjacent surfaces of the tubes. The adhesive also forms a sleeve-like high pressure sealing gasket between crimps 106 and 118, as shown in FIG. 6.

Preferably, adhesive 115 in liquid form is placed in the chamfer well between mouth 112 and tube 102 while tubes 100 and 102 are oriented vertically with the mouth of tube 100 facing upwardly as shown in FIG. 5. This orientation is maintained until tube 102 has been fully inserted in tube 100. The curing of adhesive 115 may take place at room temperature, but preferably is accelerated by an induction or resistance heat precuring sufficient to insure that the joint will withstand a pressure test up to 500 p.s.i. Completion of the curing may be obtained, as in the previous embodiment, from the heat provided in the final manufacturing step wherein the hermetic compressor unit is dehydrated for six hours at 300° F.

From the foregoing description, it will be now evident that the present invention provides an economical method of constructing a high pressure joint between two members forming a portion of the high side discharge line in a hermetic compressor. This results in part from the elimination of the costly silver soldering operation and material hitherto employed to construct such tube joints. The method readily lends itself to mechanization, and all of the steps can be performed at room temperature if desired. If there is any spillage or excess adhesive left on the outside of tubes 100 and 102 after constructing the joint, the same can be readily cleaned up before the adhesive has had an opportunity to cure. When using the preferred anaerobic adhesive, such outside adhesive, still being exposed to atmosphere, will not set up. Hence the same may be readily removed by wiping with a cloth or, in an automated set-up, with a solvent spray or the like. The adhesive not only adds shear strength to that produced by the mechanical interengagement of the metal members of the joint; it also serves as a very reliable high pressure gasket in the joint which is custom formed to each joint by being formed in situ.

I claim:

1. In a hermetic compressor the combination of a cast iron cylinder head containing a high side discharge chamber and a discharge passageway extending from said chamber to an exterior surface of said head exposed to the interior space within a hermetic casing of said compressor, said passageway having an imperforate wall defining a cylindrical bore of constant diameter terminating at its inner end at an internal shoulder in said passageway and terminating at its outer end at a tapered mouth extending between said outer end of said bore and said exterior surface and diverging toward said exterior surface, a tubular steel discharge conduit having one end thereof extending from the interior casing space in telescoping relation into said passageway via said mouth, said conduit having a first cylindrical seal portion at its inner end engaging said wall with an interference fit and abutting said internal shoulder, said conduit having a second cylindrical seal portion also engaging said wall with an interference fit adjacent said mouth, said conduit having a third portion of smaller outside diameter than said first and second seal portions and extending axially of said conduit between said seal portions for a distance of at least about 1 inch, said third portion defining an annular clearance space radially between its outer periphery and said bore wall and axially from said first to said second seal portions, the outer peripheries of said first, second and third conduit portions being imperforate, and an anaerobic curing adhesive sealant in a solid, cured state filling said clearance space and adherently engaging said bore wall and said third portion and forming a high pressure sealing gasket in said clearance space, said tapered mouth defining with the exterior of said conduit extending therethrough an annular well extending coaxially of and concentrically around said conduit and communicating with the outer periphery of said conduit, said well having a volume adapted to hold a sufficient quantity of adhesive in a liquid state to fill said annular clearance space said second seal portion closing communication between said clearance space and said well.

* * * * *